3,265,629
COATING BY PHASE SEPARATION
Erik H. Jensen, Kalamazoo Township, Kalamazoo County, Mich., assignor, by mesne assignments, to The National Cash Register Company, Dayton, Ohio, a corporation of Maryland
No Drawing. Filed Dec. 22, 1958, Ser. No. 781,915
8 Claims. (Cl. 252—316)

The invention relates to coating solid particulate matter and to products resulting therefrom, and more particularly to the step of coating said matter with solid lipid material before coating by liquid phase separation from aqueous media and to the products thereof.

Coacervation, a particularly useful form of liquid phase separation from aqueous media, is a widely applicable coating procedure capable of providing encapsulated materials having unique characteristics. These unique characteristics include the permissible microscopic size of the capsules, the structure of the coatings, the flexibility in the coating materials used, and the manner in which the coating materials can be modified.

Coating by phase separation from aqueous media, prior to the present invention, was not a satisfactory method for coating either water-soluble or water-insoluble material of a hydrophilic nature. Obviously water-soluble material will dissolve in aqueous media from which a liquid phase coating separates. Although some of the dissolved molecular units will be encapsulated, this will not occur in sufficient quantity to be practical. Probably due to hydrophilic surface, water-insoluble hydrophilic material will not be encapsulated by the separating phase.

Even a material which is neither water-soluble nor hydrophilic and therefore amenable to a coating procedure by liquid phase separation from aqueous media presents a disadvantage when so coated due to the partial permeability of the usual mantle produced by phase separation. This partial permeability is especially disadvantageous when such coated material is exposed to a material to which the mantle is permeable and the coated matter is incompatible. For example, matter which is decomposed by hydrogen ions would be only partially protected from attack and decomposition when coated by phase separation with the usual coating materials and then placed in acidic media.

The present invention comprises the step of precoating solid particulate matter with a solid lipid material before encapsulation of said coated material by the technique of liquid phase separation from aqueous media.

The particle when coated by the process of the present invention has a protective coat which comprises two distinct layers, (1) a layer of solid lipid material and (2) a layer or mantle of colloidal or polymeric material. The thickness of the coating is therefore the sum of the thicknesses of the two layers.

In general the thickness of the lipid layer can, within limits, be controlled by the ratio of the amount of material to be coated to lipid material. Thus, if a thicker lipid layer is desired, more lipid material should be used. As is apparent, the smaller the particle size of the material to be coated, the greater the total surface area to weight, a larger amount of lipid material is required to achieve the same layer thickness as that required when employing the same weight of material of larger particle size.

Similarly, the thickness of the colloid or polymer mantle is variable.

The process of the present invention is particularly advantageous for the coating of solid particulate matter which is in an extremely fine state of subdivision, i.e., from about 0.5 to 200 microns in diameter; however, the process can also be used for coating of individual particles that are considerably larger, i.e., the particle can be a tablet which is a centimeter or more in diameter, and, obviously, particles of intermediate size can be coated. The particular particle size is not critical to the process of the invention, but is determined by the use to which the coated particle is to be employed. For example, a micronized powder (0.5 to 10 micron size) is desirable for vitamins and other food supplements, for substances to be incorporated into cosmetic formulations, and for insecticides; a powdered material (up to 200 micron size) is a desirable size for rodenticides.

Particles when coated by the process of the present invention have a coating with unique characteristics. The coating is hydrophilic in nature and is therefore easily wetted and suspended in water, however the coating is not dissolved by water or the usual organic solvents and is not removed or dispersed by surfactants in an aqueous medium. The coating is not melted and the coated particles do not cake together when subjected to warm or humid atmospheric conduitions.

The novel encapsulated products of the present invention find applications due to their unique properties in the formulation of compositions for widely diversified fields of use.

In the cosmetic field, products such as soap bars, lotions, and creams can be formulated containing coated water-soluble ingredients which would be unstable or incompatible in uncoated form in the presence of other ingredients of the particular formulation. For example, since certain antibacterials such as the chlorinated phenols and neomycin sulfate are incompatible on prolonged contact with soap, the present invention makes possible the formulation of a soap bar containing both of these ingredients.

In the agricultural field, coated fertilizers, pesticides, food supplements and medicaments can be advantageously formulated. For example, water-soluble fertilizers such as ammonium nitrate, urea and superphosphate can be coated for application to the soil when a slow release or extended action is desirable, e.g., where rapid release would "burn" the vegetation. For the control of pests, coated insecticides such as calcium arsenate and copper acetoarsenite can be deposited on vegetation or in the soil without harm to the vegetation; moreover, the insecticide is not dissolved and washed away by moisture or rain, thereby allowing the insecticide to remain where deposited until ingested by the insect. Anthelmintic agents, such as piperazine, phosphate or citrate, and methylrosaniline chloride, when coated can be incorporated into feed material for domestic animals, the coated anthelmintic thereby being tasteless in the feed and also protected from decomposition during storage of the feed. Rodenticides such as calcium cyanide, thallium sulfate and sodium fluoroacetate, which are unstable in the presence of moisture or have an odor or taste repellant to the rodent are advantageously coated. A unique application of the coated material is the formulation of rodenticides having in the composition a non-coated, water-soluble antidote or emetic agent; the composition furnishing an automatic safeguard in case of accidental ingestion by domestic animals or children. The antidote or emetic can easily be washed away with water by the user or simply be permitted to wash away in actual use by atmospheric moisture or rain.

Vitamins, minerals, amino acids and other food supplements, when coated, can be incorporated in animal feeds and be protected from decomposition during storage periods from such adverse conditions as air, moisture, and incompatible ingredients in the feed composition itself. In a similar manner food supplements can be incorporated in compositions for human use.

The present invention finds application in medicinal treatment of both animals and humans. Medicaments can be coated by the methods of the present invention to give a sustained release upon ingestion with resultant sustained therapeutic action. Coatings which will not dissolve in the stomach can be formulated to overcome the problem of gastric irritation or nausea caused by such medicaments as emetine hydrochloride, quinacrine hydrochloride and para-amino-salicylic acid. Similarly, medicaments such as penicillin and certain glandular extracts which are inactivated by the acid condition or enzymes encountered in the stomach are advantageously coated.

As used in the present specification the term solution means both true solution and colloidal solution.

The term phase separation means the separation of a liquid phase from a liquid phase. Phase separation may be thought of as being a precipitation of a liquid precipitate. The separating liquid phase is of the same qualitative nature as the original single-phase system, hereinafter called mother phase, from which it separates; it is also qualitatively similar to the remaining liquid, hereinafter called equilibrium liquid with which it is in equilibrium. The separating phase differs quantitatively from the mother phase; it is more concentrated in colloid and/or polymer, and less concentrated in solvent.

As used in the present specification the term coating by phase separation means the phenomenon of inducing phase separation in the presence of suspended lipid-coated particles, the separating phase enveloping or encapsulating the suspended particles to form a mantle around each particle.

The term solid lipid material means that material which is substantially water-insoluble, but soluble in a so-called fat solvent, and which is solid or of wax-like semi-solid consistency at room temperature, i.e., about 25° C.; it includes material which is utilized or not utilized by the animal organism. For example, the definition includes such materials as waxes, fatty acids, fatty acid esters, fatty alcohols, and sterols.

The wax can be paraffin wax; a petrolatum wax; a mineral wax such as ozokerite, ceresin, utah wax or montan wax; a vegetable wax such as, for example, carnauba wax, japan wax, bayberry wax, flax wax; an animal wax such as, for example, spermaceti; or an insect wax such as beeswax, Chinese wax or shellac wax.

Additionally, the wax material can be an ester of a fatty acid having from 12 to 31 carbon atoms and a fatty alcohol having from 12 to 31 carbon atoms, the ester having from a carbon atom content of from 24 to 62, or a mixture thereof. Exemplary are myricyl palmitate, cetyl palmitate, myricyl cerotate, cetyl myristate, ceryl palmitate, ceryl certate, myricyl melissate, stearyl palmitate, stearyl myristate, lauryl laurate.

The fatty acid can have from 10 to 22 carbon atoms and can be, for example, decenoic, docosanoic, stearic, palmitic, lauric or myristic acid.

The fatty alcohols can have from 14 to 31 carbon atoms and can be, for example, lauryl alcohol, cetyl, stearyl, myristyl, myricyl, arachyl, carnubyl or ceryl alcohol.

The esters can be mono-, di- or triglyceryl esters formed from fatty acids having from 10 to 22 carbon atoms, such as, for example, glyceryl distearate, glyceryl tristearate, glyceryl monostearate, glyceryl dipalmitate, gylceryl tripalmitate, glyceryl monopalmitate, glyceryl dilaurate glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, or glyceryl tridecenoate.

The sterols can be, for example, cholesterol, stigmasterol, and sitosterol.

The phosphatides, also called phospholipids, can be, for example, lecithin.

The coating of the solid particulate matter with solid lipid material can be accomplished by a variety of methods.

The material to be coated can be placed in a standard tablet coating pan and the lipid material melted and poured into the rotating pan. The pan is heated to a temperature above the melting point of the lipid material in order to facilitate the even distribution of the lipid material over the surface of the material to be coated. After the lipid material is evenly distributed, the pan and its contents are allowed to cool, with continuing rotation and the lipid material solidifies.

Another method utilizing the tablet coating pan is to dissolve the lipid material in a solvent which dissolves the lipid material but is not a solvent for the matter to be coated. The matter to be coated is placed into the coating pan and the solution of lipid material is poured or sprayed into the rotating pan. A current of warm air can be passed over the rotating matter to facilitate the removal of the solvent and deposition of lipid material.

Another method of depositing a coating of lipid material is accomplished by dissolving the lipid material in a solvent, suspending the matter to be coated therein, and spraying the suspension into a spray dryer.

When the lipid material is a semi-solid at the temperature at which coating by phase separation is to be accomplished, another method of coating is possible. The lipid material is melted and the matter to be coated is suspended therein. The suspension is then dispersed into the aqueous media from which phase separation is to be accomplished.

After having received a coating of a solid lipid material the solid particulate matter is then ready to be coated by phase separation. The various ways in which coating by phase separation can be accomplished are conveniently considered with regard to the composition of the coating material or the composition of the phase.

In the first method, the mother phase comprises an aqueous solution (colloidal dispersion) of a gelable hydrophilic colloid. This method is described in U.S. Patent No. 2,800,458 and classified as a "simple coacervate" by H. G. Bungenberg de Jong and Ong Sian Gwan in Biochemische Zeitschrift, 221: 182–205 (1930). By this method an aqueous solution of a gelable hydrophilic colloid, e.g., gelatin, agar-agar, albumin, alginates, casein, pectins, and fibrinogen, is prepared at a temperature above the gelling point of the colloid, the particle to be coated is suspended in the system, and phase separation is induced by modifying the system with an additive. Such additives include (1) aqueous solutions of electrolytes such as the salts of sodium, potassium, ammonium and lithium cations and sulfate, citrate, acetate and chloride anions or (2) a water-soluble liquid in which the gelable hydrophilic colloid is less soluble than in water such as methanol, ethanol, propanol, acetone and dioxane. A critical concentration exists for each additive in each particular colloid system below which phase separation will not be induced. This concentration is easily determined by routine testing as shown in U.S. Patent 2,800,458. The colloid-rich phase on separating collects about the surface of the suspended particle, encapsulating the particle with a liquid mantle of the colloid-rich phase. In the absence of the suspended particle, the colloid-rich phase separates in the form of microscopic droplets which on the addition of the particle will then collect on the particle and encapsulate it. When encapsulation is completed the temperature of the system is lowered below the gelling temperature of the colloid-rich phase thereby changing the colloid mantle from a liquid to a gel. The coated particle can then be removed and/or the coating treated to alter its characteristics.

Another method involves a mother phase comprising an aqueous solution (colloidal dispersion) of at least two hydrophilic colloids. This method is described in U.S. Patent 2,800,457 and classified as "complex coacervation"

by H. G. Bungenberg de Jong and Ong Sian Gwan in Biochemische Zeitschrift, 221: 182–205 (1930). For this method it is essential that at least one of the colloids be gelable and that at least one colloid have an electrophoretic charge opposite from the other(s) in the system. With the preceding requirements in mind, the colloids to be used can be chosen from the various gelable and nongelable hydrophilic colloids and their derivatives, as, for example, gelatin, agar-agar, albumin, alginates, casein, pectins, fibrinogen, starch acetate phthalate, cellulose acetate phthalate, and the like. The optimal concentration of the colloids can be determined by routine testing as described in U.S. Patent 2,800,457. Phase separation is induced by adjustment of pH and/or addition of water. The proper pH or amount of water to be added is easily determined by testing as described in the cited patent.

The coating of the suspended particles then takes place in a similar manner to that described in the first method.

The following remarks are directed to the coatings produced by both the first and second methods.

The gelation step is significant with respect to the permeability of the coating. With many colloid-rich systems, instantaneous gelling of the colloid-rich phase, as by adding the liquid colloid-rich phase to ice water, produces a gelled coating having high permeability. With many other systems prolonged cooling favors a coating of high permeability. With still other colloid-rich systems the lowest permeability or highest impermeability is obtained with intermediate cooling rates. Thus a highly impermeable coating is produced in the case of gelatin on cooling the newly-formed coating from 50° C. to about 5° C. in a period of approximately 30 minutes with continuous stirring.

Following gelation of the colloid-rich phase, the gelled coating is hardened, plasticized or otherwise treated to adapt it to the intended use. For example, when the colloid-rich phase contains a protein colloid such as gelatin, fibrinogen or collagen, treating the gelled coating with a 37% aqueous solution of formaldehyde under alkaline conditions produces a hardened shell which can then be dried. For most applications, contact of the coating with the said formaldehyde solution for a period of about 10 minutes is productive of a material having sufficient hardness and resistance to abrasion to withstand the normal usage of packaging or handling. Variations in the hardness of the coating can be obtained by varying the quantity of hardening agent and the period of contact therewith. Hardening likewise has considerable influence on the permeability of the coat, both with respect to the invasion of environmental fluids which would cause disintegration of the coating and to the containment of active ingredients.

Hardening can be accomplished by a drying process. By removing the water occluded within the mantle, the mantle is hardened. The drying can be accomplished by exposure to hot air or other methods such as containment within a closed vessel which contains a desiccant.

Another method of coating by phase separation employs an aqueous solution of a synthetic linear macromolecular polymer whose polymer units comprise both lipophilic and hydrophilic units. Thus, one class of recurring polymer unit is essentially lipophilic in character, e.g., one derived from styrene, an alkyl ring substituted styrene, ether, ester or halogen ring substituted styrene, an ether or ester substituted ethylene; and the other major recurring unit is essentially hydrophilic in character, e.g., derived from maleic acid, maleic acid amide, acrylic acid, crotonic acid, and acrylic acid amide. In combination, these lipophilic and hydrophilic units preferably comprise a majority of the polymeric units present in the polymer. Other polymer units may also be present in the copolymer, so long as they are present in minor amounts, i.e., less than either the hydrophilic or lipophilic polymer units. Included among these polymers are the hydrolyzed styrene-maleic anhydride copolymers, styrene-maleic acid amide polymer, the sulfonated polystyrenes, the carbohydrate acetate phthalates (e.g., starch acetate phthalate, cellulose acetate phthalate and amylose acetate phthalate), polymethacrylic acid, and methyl vinyl ether-maleic acid copolymer.

Preferred among the polymers employed by this method are the hydrolyzed styrene-maleic anhydride copolymers the anhydride groups of which are preferably at least 50% hydrolyzed. The copolymer can also contain other polymer units in minor amounts, e.g., those derived from acrylonitrile, acrylic acid, methacrylic acid, itaconic acid, ethyl vinyl ether, methyl vinyl ether, vinyl chloride, vinylidene chloride, etc., and the like.

The solubility of the polymers employed by this method vary considerably in a selected aqueous liquid. For example, completely hydrolyzed styrene-maleic anhydride polymer is about 2% soluble in water but at least 20% soluble in a 50:50 mixture of methanol and water. Thus, solutions of the desired polymer can be prepared in relatively dilute form in water alone. Alternatively, the concentration of the polymer can be increased by the addition of a solubilizing agent, e.g., another hydrophilic liquid such as, for example, methanol or ethanol. Another type of solubilizing agent useful when carboxylic acid polymers are employed are the polysaccharides, e.g., alginates, pectins, methylcellulose, carboxymethylcellulose, etc. Of particular usefulness are the galactose polysaccharides, e.g., carrageen (derived from Irish moss), available as Sea Kem Type No. 1 from Seaplant Chemical Corporation, New Bedford, Massachusetts. For example, the solubility of completely hydrolyzed styrene-maleic anhydride copolymer in water can be raised from about 2% to about 7 to 10% in the presence of relatively small amounts of this polysaccharide, e.g., one part to four parts of the copolymer. Higher concentrations of the acid polymers can also be achieved by passing a solution of an alkali-metal salt thereof through a bed of sulfonic acid ion exchange resin, e.g., Dowex 50.

Phase separation is induced by the addition of a solution of a suitable electrolyte as salts of magnesium, ammonia, potassium and lithium cations and sulfate, phosphate, citrate, acetate, chloride, bromide, thiocyanate and nitrate anions. The salt should be added in amounts sufficient to produce a significant percentage thereof by weight per volume of the resulting mixture, e.g., 1 to 50% and preferably 3 to 20%.

Alternatively, when a non-aqueous hydrophilic liquid is employed, or when it is not desired to use a salt as the additive, a solvent can be employed which is, under conditions of the process, soluble in the hydrophilic liquid and essentially a non-solvent for the polymer. Thus a saturated alkanol or glycol solution of the copolymer can be diluted with water or other solvent to induce separation of the polymer-rich phase. Other liquids which can be used include tetrahydrofuran, the higher alkanols, dioxane, dimethyl formamide, and dimethyl acetamide.

The proper amount of additive for inducing phase separation is readily determined beforehand by the addition of increasing amounts of the selected additive to a previous solution of the polymer, identical with that to be employed in the encapsulation process, until phase separation occurs in an appreciable amount. This is observable as a visable clouding of the solution.

In carrying out the process of this method, the selected polymer is dissolved in the selected aqueous medium, the particle to be coated is suspended therein, and phase separation is induced by a suitable additive. A polymer-rich liquid phase separates and encapsulates the suspended particle.

In the next step of the process, the pH of the system containing the encapsulated product is adjusted so as to reduce the solubility of the mantle of the thus-produced encapsulated product in the aqueous solvent. If the starting polymer is acidic in character, then the solution is made acidic. Conversely, if the polymer is basic in character, the solution is made basic. In general, it can be said that in this step, the ionizing properties of the mantle are reduced, thus reducing its affinity towards the aqueous solvent. The correct pH can be determined by visual means, either by observing a change in the appearance of the encapsulated product or by observing the particles under a microscope. The mantle or polymer-rich phase as it forms has a somewhat transparent appearance, whereas when it is converted to isolatable form by adjustment of the pH, it becomes more opaque or translucent.

Any strong acid or base can be employed to adjust the pH, e.g., hydrochloric acid, sulfuric acid and sodium and potassium hydroxide.

This method is thus different from methods 1 and 2, both in the material used and the step by which an isolatable encapsulated product is produced. In the first and second methods, the critical step in producing an isolatable product is the step of chilling to below the gelation temperature of the gelable colloid employed. In the instant method, gelability is not a critical characteristic of the polymer employed. Instead, the combination of lipophilic and hydrophilic polymer units in the polymer enable the polymer to encapsulate while at the same time having ionizing properties which can be altered by the adjustment of the pH of the aqueous solvent. Thus when the polymer mantle is formed, it is "fixed" by adjusting the pH of the aqueous solution in which the encapsulated product is suspended, thereby producing a mantle which is rigid enough to separate the encapsulated product from the suspending liquid.

The thus-produced encapsulated product can be isolated by centrifugation or filtration to remove the aqueous liquid and then washing the encapsulated material, e.g., with water, but avoiding such vigorous washing as will redissolve a significant amount of the polymer mantle. Alternatively, the total reaction product can be freeze-dried or dried at from about room temperature to about 60° C., e.g., under vacuum.

The mantle of the encapsulated product can be further hardened by exposure to reagents which will chemically alter the surface groups of the polymer mantle, e.g., the polymer can be reacted with a monomer to produce cross-linking or reacted with a salt containing a polyvalent cation, e.g., aluminum sulfate or barium chloride, when the structure of the polymer permits.

Still another method of coating by phase separation employs an aqueous solution of a styrene-maleic acid copolymer capable of having an electrophoretic charge (of the type described in the preceding method) and a gelable hydrophilic colloid which is of opposite charge at the pH at which significant phases separation takes place.

The aqueous solutions which can be employed in the process of this method include water solutions and aqueous solutions which comprise water and a water-soluble hydroxy compound such as a lower alkanol, e.g., methanol and ethanol; a lower alkylene glycol, e.g., ethylene glycol, propylene glycol and trimethylene glycol; a lower alkyl triol, e.g., gycerol; and mixtures thereof.

The glycols and triols as defined above are also useful additives to prevent coalescence of the encapsulated product and to produce a product having superior handling properties. Examples of other anti-coalescing agents are the polyethylene glycols 200 to 600.

Either separately or together with the copolymer, a solution of the selected colloid, e.g., gelatin, agar-agar, albumin, alginates, casein, pectins and chitosans, is prepared. Sometimes, e.g., when it is difficult to stay outside the condition under which phase separation occurs, it is preferred to prepare a solution of the copolymer and a solution of the colloid separately. Ordinarily it is necessary to adjust the pH of one or both of the solutions to prevent phase separation when they are mixed. Alternatively, a mixture of the colloids, copolymer and the selected aqueous solvent can be heated, e.g., to above the gel temperature of the colloid and the pH adjusted until phase separation occurs.

The particle to be coated is suspended in the mother phase and phase separation induced by adjusting the pH. The correct pH for inducing phase separation is readily determined by adding acid or base to a clear solution of a mother phase until clouding occurs, similar to the trial procedures in the previous methods.

In the presence of the suspended particles to be coated, the separating copolymer-colloid-rich phase coats the particle, forming a mantle thereover, thus producing the encapsulated product.

At this stage, the mantle is ordinarily still quite mobile and not amenable to isolation. However, the mantle is, to a degree, self-hardening and will produce a more stable mantle upon standing, preferably from 30 minutes to several hours or days at a temperature above the gelation temperature of the colloid. Techniques well known in the tanning art for the tanning of hides, can be employed to accelerate this autohardening, e.g., suspending the encapsulated product for 15 minutes in 10% aqueous ferric chloride or 10% tannic acid in isopropyl alcohol, or in 10% aqueous ferric chloride for 15 minutes at room temperature and then in 20% tannic acid in glycerin.

Alternaitvely, other hardening agent or agents can be added to the total mixture containing the encapsulated product. Preferred are the highly active carbonyl compounds, especially those having from one to 8 carbon atoms, inclusive. Examples of these are formaldehyde, glyoxal, phenylglyoxal, malonic acid dialdehyde, pyruvaldehyde, glyceraldehyde, diacetyl and methyl phenyl ketone. Heating will sometimes accelerate the hardening process, but care should be taken not to disrupt the still mobile mantle.

Alternatively, the encapsulated product can be hardened by exposure to reagents which will chemically alter the surface groups of the polymer mantle, e.g., the polymer can be reacted with a monomer to produce cross-linking, when the structure of the polymer permits, or irradiated, e.g., with high velocity electron bombardment, e.g., with a Van de Graaf electro-generator, to change the molecular structure of them onomer and, desirably to concommitantly sterilize the encapsulated material.

The thus-produced encapsulated product can be isolated by centrifugation or filtration to remove the aqueous liquid and then washing the encapsulated material thoroughly, e.g., with water or dilute acid, e.g., dilute acetic acid, and then dried, e.g., freeze or spray dried.

The following examples are illustrative of the process and products of the present invention and are not to be construed as limiting.

*Example 1*

About 40 gm. of white wax are dissolved in 400 ml. of chloroform and about 80 gm. of micronized methionine powder suspended in the solution. The methionine suspension is then spray dried without the use of heat (during the spray drying the chloroform evaporates from the system and the wax deposits evenly on the methionine particles). The resulting product is collected and is suitable for coating by the method of phase separation.

A colloidal solution of 100 gm. of gelatin in 900 ml. of water is prepared at from about 40° to 50° C. About 120 gm. of the wax-coated methionine are added to the system, with adequate stirring to maintain the particles uniformly suspended. With stirring and with the temperature maintained at from about 40° to 50° C., ethanol (95%) is slowly added to the system. When the concentration of ethanol reaches about 50% v./v., phase separation is induced and the separating colloid-rich phase encapsulates the dispersed wax-coated methionine particles. When the ethanol concentration reaches about 55% v./v., the whole mixture is cooled to below 10° C. to gel the colloid-rich phase. The coated methionine is separated from the bulk of the residual liquid, advantageously by centrifuging. Thereafter the coated methionine is washed thoroughly by suspending in 2000 ml. of water and then removed by centrifuge and dried.

The coated particles of methionine are usefully mixed with animal feeds as a food supplement.

*Example 2*

About 80 gm. of powdered methionine are placed in a tablet coating pan and allowed to rotate. About 40 gm. of beeswax are dissolved in 400 ml. of chloroform and the solution slowly poured over the powder in the rotating pan. During the addition of the wax solution, warm air is blown into the coating pan to effect the evaporation of the solvent and the simultaneous deposition of the lipid material on the solid particles. When all of the solution has been added and the chloroform evaporated, the wax-coated particles are removed from the coating pan and are suitable for coating by the technique of phase separation.

Twenty-seven grams of acacia powder are dissolved in 167 ml. of water heated to 40° C. When the acacia has dissolved, a sufficient amount of a 20% acetic acid solution is added to give a pH of 3.9. The temperature of the solution is maintained at 40° C.

Twenty grams of gelatin are dissolved in 167 ml. of water heated to 40° C. When the gelatin has dissolved, a sufficient amount of a 20% acetic acid solution is added to give a pH of 3.9. The temperature of the solution is maintained at 40° C.

About 120 gm. of the wax-coated methionine are dispersed in the acacia solution and the gelatin solution is slowly added with stirring. About 415 ml. of water, previously heated to 40° C. is added dropwise to bring about separation of the colloid-rich phase which coats the wax-coated methionine. The mixture is maintained at 40° C. for about 20 minutes and then cooled over a period of about 30 minutes to about 4° C. The mixture is maintained below 6° C. for about 1 hour. The pH of the mixture is adjusted to 9.5 by the addition of 10% sodium hydroxide solution and about 20 ml. of a 30% glyoxal solution is added dropwise. The solution is maintained below 6° C. for an additional 2 hours and then allowed to warm to room temperature. The coated particles of methionine are removed by centrifugation.

The particles are twice washed by dispersing in 1000 ml. of water and separated by centrifugation. The particles are then redispersed in 1000 ml. of water and spray dried.

The coated particles of methionine are usefully mixed with animal feeds as a food supplement.

*Example 3*

Ten grams of glyceryl monostearate are heated to 60° C. (at which temperature it becomes a wax-like fluid) and 20 gm. of calcium carbonate are dispersed therein. The temperature is maintained at 60° C.

Six grams of acacia powder are dissolved in 48 ml. of water heated to 60° C. When the acacia has dissolved, the pH of the solution is adjusted to 3.9 by the addition of 20% acetic acid solution. The temperature is maintained at 60° C.

Six grams of gelatin are dissolved in 48 ml. of water heated to 60° C. When the gelatin has dissolved, the pH of the solution is adjusted to 3.9 by the addition of 20% acetic acid solution. The temperature is maintained at 60° C.

With vigorous stirring, the calcium carbonate-glyceryl monostearate mixture is dispersed in the acacia solution and with continuous stirring the gelatin solution is slowly added. About 90 ml. of water heated to 60° C. are added dropwise to bring about separation of the colloid phase which coats the dispersed particles of glyceryl monostearate containing the calcium carbonate. After the addition of the water, the temperature is maintained at 60° C. for 15 minutes and then cooled to below 6° C. over a period of 30 minutes. The mixture is maintained below 6° C. for 30 minutes. The pH is adjusted to 9.5 by the addition of a 10% sodium hydroxide solution and 10 ml. of a 30% glyoxal solution added dropwise. The mixture is maintained below 6° C. for 2 hours and then heated to room temperature. The coated particles of calcium carbonate are removed by centrifugation.

The coated particles are twice washed by dispersing in 1000 ml. of water and separated by centrifugation. The particles are then redispersed in 500 ml. of water and freeze dried.

*Example 4*

About 33 gm. of glyceryl tripalmitate are dissolved in about 350 ml. of carbon tetrachloride and about 66 gm. of pulverized ascorbic acid suspended in the solution. The suspension is then spray dried without the use of heat (during the spray drying the carbon tetrachloride evaporates from the system and the glyceryl tripalmitate deposits evenly on the ascorbic acid particles). The resulting product is collected and is suitable for coating by the method of phase separation.

A colloidal solution of 100 gm. of gelatin in 900 ml. of water is prepared at from about 40° to 50° C. About 100 gm. of glyceryl tripalmitate-coated ascorbic acid is added to this system, with adequate stirring to maintain the particles uniformly suspended. With stirring and with the temperature maintained at from about 40° to 50° C., ethanol (95%) is slowly added to the system. When the concentration of ethanol reaches about 50% v./v., the gelatin-rich phase separates and coats the dispersed ascorbic acid particles. When the ethanol concentration reaches about 55% v./v., the whole mixture is cooled to from about 2° to 6° C. to gel the gelatin coating. The coated ascorbic acid is separated from the bulk of the residual liquid, advantageously by centrifuging. Thereafter the coated ascorbic acid is washed thoroughly by suspending in 2000 ml. of water and then removed by centrifuge and dried.

The coated particles of ascorbic acid are usefully administered to animals (including humans) as a therapeutic or prophylactic treatment. The particles can be suspended in aqueous solutions of the water-soluble vitamins, including cyanocobalamin, and the protective coating prevents the degradation of cyanocobalamin by ascorbic acid.

*Example 5*

About 66 gm. of finely pulverized sodium fluoroacetate are placed in a tablet coating pan and allowed to rotate. About 33 gm. of Chinese wax are dissolved in about 350 ml. of benzene and the solution slowly poured over the sodium fluoroacetate in the rotating pan. During the addition of the benzene solution, warm air is gently blown into the coating pan to effect the evaporation of the solvent and the simultaneous deposition of the lipid material on the solid particles. When all of the solution has been added and the solvent evaporated, the Chinese wax-coated particles of sodium fluoroacetate are removed from the coating pan and are suitable for coating by the technique of phase separation.

A colloidal solution of 100 gm. of gelatin in 900 ml. of water is prepared at from about 40° to 50° C. About 100 gm. of Chinese wax-coated sodium fluoroacetate is added to this system, with adequate stirring to maintain the particles uniformly suspended. With stirring and with the temperature maintained at from about 40° to 50° C., ethanol (95%) is slowly added to the system. When the concentration of ethanol reaches about 50% v./v., the gelatin-rich phase separates and coats the dispersed sodium fluoroacetate particles. When the ethanol concentration reaches about 55% v./v., the whole mixture is cooled to from about 2° to 6° C. to gel the gelatin coating. The coated sodium fluoroacetate is separated from the bulk of the residual liquid, advantageously by centrifuging. Thereafter the coated sodium fluoroacetate is washed thoroughly by suspending in 2000 ml. of water and then removed by centrifuge and dried.

The coated particles of sodium fluoroacetate are useful in the formulation of rodenticidal compositions containing the usual baits, e.g., wheat, oats, sugar, etc. Advantageously an emetic can be incorporated in the compositions as a safeguard against accidental ingestion by animals or children. The coating of the sodium fluoroacetate delays its action until the coating is broken by digestive action; the emetic, being without a coating, acts immediately to induce emesis and the removal of the poisonous material from the stomach before the coating is broken.

*Example 6*

About 33 gm. of ceresin are dissolved in about 350 ml. of carbon tetrachloride and about 66 gm. of pulverized methylrosaniline chloride suspended in the solution. The suspension is then spray dried without the use of heat (during the spray drying the carbon tetrachloride evaporates from the system and the ceresin deposits evenly on the methylrosaniline chloride particles). The resulting product is collected and is suitable for coating by the method of phase separation.

A colloidal solution of 100 gm. of gelatin in 900 ml. of water is prepared at from about 40° to 50° C. About 100 gm. of ceresin-coated methylrosaniline chloride is added to this system, with adequate stirring to maintain the particles uniformly suspended. With stirring and with the temperature maintained at from about 40° to 50° C., ethanol (95%) is slowly added to the system. When the concentration of ethanol reaches about 50% v./v., the gelatin-rich phase separates and coats the dispersed methylrosaniline chloride particles. When the ethanol concentration reaches about 55% v./v., the whole mixture is cooled to from about 2° to 6° C. to gel the gelatin coating. The coated methylrosaniline chloride is separated from the bulk of the residual liquid, advantageously by centrifuging. Thereafter the coated methylrosaniline chloride is washed thoroughly by suspending in 2000 ml. of water and then removed by centrifuge and dried.

The coated particles of methylrosaniline chloride are usefully administered as an anthelmintic treatment. The particles can be mixed with feed for animals. For children the particles can be mixed with sugar and be given as a powder or suspended in a flavored syrup and administered in fluid dosage form.

*Example 7*

About 80 gm. of micronized ammonium nitrate are placed in a tablet coating pan and allowed to rotate. About 40 gm. of stearic acid are dissolved in about 400 ml. of benzene and the solution slowly poured over the ammonium nitrate in the rotating pan. During the addition of the benzene solution, warm air is blown into the coating pan to effect the evaporation of the solvent and the simultaneous deposition of the lipid material on the solid particles. When all of the solution has been added and the solvent evaporated, the stearic acid-coated particles of ammonium nitrate are removed from the coating pan and are suitable for coating by the technique of phase separation.

Twenty-seven grams of acacia powder are dissolved in 167 ml. of water heated to 40° C. When the acacia has dissolved, a sufficient amount of a 20% acetic acid solution is added to give a pH of 3.9. The temperature of the solution is maintained at 40° C.

Twenty grams of gelatin are dissolved in 167 ml. of water heated to 40° C. When the gelatin has dissolved, a sufficient amount of a 20% acetic acid solution is added to give a pH of 3.9. The temperature of the solution is maintained at 40° C.

About 120 gm. of the stearic acid-coated ammonium nitrate are dispersed in the acacia solution and the gelatin solution is slowly added with stirring. About 415 ml. of water, previously heated to 40° C. is added dropwise to bring about separation of the colloid-rich phase which coats the stearic acid-coated ammonium nitrate. The mixture is maintained at 40° C. for about 20 minutes and then cooled over a period of about 30 minutes to about 4° C. The mixture is maintained below 6° C. for one hour. The pH of the mixture is adjusted to 9.5 by the addition of 10% sodium hydroxide solution and about 20 ml. of a 30% glyoxal solution is added dropwise. The solution is maintained below 6° C. for an additional one hour and then allowed to warm to room temperature. The coated particles of ammonium nitrate are removed by centrifugation.

The particles are twice washed by dispersing in 1000 ml. of water and separated by centrifugation. The particles are then redispersed in 1000 ml. of water and spray dried.

The coated particles of ammonium nitrate are usefully applied to the soil as a fertilizer. The coating allows slow release of the ammonium nitrate thereby preventing "burning" of the vegetation.

*Example 8*

About 80 gm. of finely pulverized neomycin sulfate are placed in a tablet coating pan and allowed to rotate. About 40 gm. of spermaceti are dissolved in about 500 ml. of ether and the solution slowly sprayed over the neomycin sulfate in the rotating pan. During the addition of the ether solution, warm air is blown into the coating pan to effect the evaporation of the solvent and the simultaneous deposition of the lipid material on the solid particles. When all of the solution has been added and the solvent evaporated the spermaceti-coated particles of neomycin are removed from the coating pan and are suitable for coating by the technique of phase separation.

Twenty-seven grams of acacia powder are dissolved in 167 ml. of water heated to 40° C. When the acacia has dissolved, a sufficient amount of a 20% acetic acid solution is added to give a pH of 3.9. The temperature of the solution is maintained at 40° C.

Twenty grams of gelatin are dissolved in 167 ml. of water heated to 40° C. When the gelatin has dissolved, a sufficient amount of a 20% acetic acid solution is added to give a pH of 3.9. The temperature of the solution is maintained at 40° C.

About 120 gm. of the spermaceti-coated neomycin are dispersed in the acacia solution and the gelatin solution is slowly added with stirring. About 415 ml. of water, previously heated to 40° C. is added dropwise to bring about separation of the colloid-rich phase which coats the spermaceti-coated neomycin. The mixture is maintained at 40° C. for about 20 minutes and then cooled over a period of about 30 minutes to about 4° C. The mixture is maintained below 6° C. for one hour. The pH of the mixture is adjusted to 9.5 by the addition of 10% sodium hydroxide solution and about 20 ml. of a 30% glyoxal solution is added dropwise. The solution is maintained below 6° C. for an additional one hour and then allowed to warm to room temperature. The coated particles of neomycin are removed by centrifugation.

The particles are twice washed by dispersing in 1000 ml. of water and separated by centrifugation. The particles are then redispersed in 1000 ml. of water and spray dried.

The coated particles of neomycin are usefully incorporated in formulations of hand lotions, creams and soap bars. The neomycin is protected from decomposition by soaps or surfactants.

*Example 9*

About 80 gm. of micronized calcium arsenate are placed in a tablet coating pan and allowed to rotate. About 40 gm. of cetyl alcohol are dissolved in about 500 ml. of methanol and the solution slowly poured over the calcium arsenate in the rotating pan. During the addition of the methanol solution, warm air is blown into the coating pan to effect the evaporation of the solvent and the simultaneous deposition of the lipid material on the solid particles. When all of the solution has been added and the solvent evaporated, the cetyl alcohol-coated particles of calcium arsenate are removed from the coating pan and are suitable for coating by the technique of phase separation.

Twenty-seven grams of acacia powder are dissolved in 167 ml. of water heated to 40° C. When the acacia has dissolved, a sufficient amount of a 20% acetic acid solution is added to give a pH of 3.9. The temperature of the solution is maintained at 40° C.

Twenty grams of gelatin are dissolved in 167 ml. of water heated to 40° C. When the gelatin has dissolved, a sufficient amount of a 20% acetic acid solution is added to give a pH of 3.9. The temperature of the solution is maintained at 40° C.

About 120 gm. of the cetyl alcohol-coated calcium arsenate are dispersed in the acacia solution and the gelatin solution is slowly added with stirring. About 415 ml. of water, previously heated to 40° C. is added dropwise to bring about separation of the colloid-rich phase which coats the cetyl alcohol-coated calcium arsenate. The mixture is maintained at 40° C. for about 20 minutes and then cooled over a period of about 30 minutes to about 4° C. The mixture is maintained below 6° C. for one hour. The pH of the mixture is adjusted to 9.5 by the addition of 10% sodium hydroxide solution and about 20 ml. of a 30% glyoxal solution is added dropwise. The solution is maintained below 6° C. for an additional one hour and then allowed to warm to room temperature. The coated particles of calcium arsenate are removed by centrifugation.

The particles are twice washed by dispersing in 1000 ml. of water and separated by centrifugation. The particles are then redispersed in 1000 ml. of water and spray dried.

The coated particles of calcium arsenate are usefully incorporated in formulations of insecticides. The coating protects the vegetation from injury due to the calcium arsenate and protects the calcium arsenate from being dissolved away by moisture or rain water.

*Example 10*

About 10 gm. of sitosterol are dissolved in about 100 ml. of ether and about 15 gm. of micronized caffeine suspended in the solution. The caffeine suspension is then spray dried without the use of heat (during the spray drying the ether evaporates from the system and the sitosterol deposits on the caffeine particles). The resulting product is collected and is suitable for coating by the method of phase separation.

Twenty-five grams of styrene-maleic acid copolymer are dissolved in about 1250 ml. of water and heated to 80° C. About 25 gm. of sitosterol-coated caffeine are suspended in the copolymer solution. With constant stirring of the suspension, 275 ml. of a 20% sodium sulfate solution, heated to 80° C., are added dropwise. The mixture is maintained at 80° C. for 20 minutes.

About 250 ml. of glacial acetic acid is mixed with about 2500 ml. of 20% sodium sulfate solution and cooled to about 5° C. With vigorous stirring, the suspension is slowly added to the cool, acidified sodium sulfate solution.

The coated particles of caffeine are removed by centrifugation and washed several times by alternatively suspending in water and separating by centrifugation. As a final step, the coated particles are suspended in 500 ml. of water and freeze dried.

The coated particles of caffeine are usefully incorporated in formulations of orally administerable compositions for sustained release of the stimulant.

*Example 11*

About 20 gm. of stigmasterol are dissolved in about 200 ml. of ether and about 30 gm. of urea suspended in the solution. The urea suspension is then spray dried without the use of heat (during the spray drying the ether evaporates from the system and the stigmasterol deposits on the urea particles). The resulting product is collected and is suitable for coating by the method of phase separation.

About 20 gm. of styrene-maleic acid copolymer and about 5 gm. of Sea Kem, Type No. 1, are mixed and dispersed in 100 ml. of propylene glycol. About 500 ml. of water are added to the dispersion and heated to 80° C. to dissolve. About 50 gm. of the stigmasterol-coated urea are suspended in the solution and a solution of about 20 gm. of gelatin dissolved in 100 ml. of water at 80° C. is added dropwise. The suspension is maintained at 80° C. with stirring for 15 minutes and then cooled to 4° C. over a period of 30 minutes. The suspension is maintained at 4° C. for one hour and then about 20 ml. of 37% aqueous formaldehyde soltuion is added and the pH adjusted to pH 8.0 with a sufficient amount of 10% aqueous sodium hydroxide solution. The suspension is maintained at 4° C. for one hour and then the encapsulated urea removed by centrifugation. The encapsulated particles are resuspended in 1% hydrochloric acid solution and spray dried.

The coated particles of urea are usefully mixed with animal feeds and fed to ruminants as a fortified nitrogen containing feed.

It is to be understood that this invention is not to be limited to the exact details of operation or exact compositions shown and described, as obvious modifications and equivalents will be apparent to one skilled in the art, and the invention is therefore to be limited only by the scope of the appended claims.

What is claimed is:

1. A process for coating, en masse, a plurality of solid individual discrete particles selected from the group consisting of water-soluble and water-insoluble hydrophilic material, comprising the steps of (1) coating en masse each of said individual discrete particles with a solid lipid material;

(2) suspending the coated particles in an aqueous solution of at least one encapsulating material;

(3) inducing phase separation, whereby to cause the formation of a phase rich in encapsulating material and the encapsulation of each of the solid individual suspended coated particles with said encapsulating material; and (4) rigidifying the encapsulating material.

2. The process of claim 1 in which the diameter of the particles varies from about 0.5 micron to about 200 microns.

3. The process of claim 1 in which the encapsulating material is a gelable hydrophilic colloid, steps (2) and (3) are carried out at a temperature above the gelation point of the hydrophilic colloid, and the step of rigidifying the encapsulating material comprises gelling by cooling.

4. The process of claim 1 in which the encapsulating material is a mixture of at least two hydrophilic colloids at least one of which is gelable and one of which has the opposite electrophoretic charge from the remaining colloids, steps (2) and (3) are carried out at a temperature above the gelation point of the gelable hydrophilic colloid, and the step of rigidifying the encapsulating material comprises gelling by cooling.

5. The process of claim 4 in which the coated and encapsulated particles are separated from the liquid material and thereafter the encapsulating material is dried.

6. The process of claim 5 in which the encapsulating material is additionally hardened.

7. The process of claim 1 in which the encapsulating material is a linear macromolecular synthetic polymer, a majority of whose polymer units comprise both hydrophilic and lipophilic moieties, and the step of rigidifying the encapsulating material comprises adjusting the pH of the aqueous solution.

8. The process of claim 1 in which the encapsulating material is an electrophoretically chargeable styrene-maleic acid copolymer and a gelable hydrophilic colloid which is oppositely electrophoretically chargeable at a pH outside the range which induces liquid phase separation, steps (2) and (3) are carried out at a temperature above the gelation point of the gelable hydrophilic colloid, and the step of rigidifying the encapsulating material comprises at least one of the steps of (a) cooling to a temperature below the gelation temperature of the gelable hydrophilic colloid and (b) adding to the system a highly active carbonyl compound.

References Cited by the Examiner

UNITED STATES PATENTS

| | | | |
|---|---|---|---|
| 2,585,903 | 2/1952 | Meyer | 167—83 XR |
| 2,770,571 | 11/1956 | Vance et al. | 167—83 |
| 2,800,457 | 7/1957 | Green et al. | 252—316 |
| 2,800,458 | 7/1957 | Green | 252—316 |
| 2,844,512 | 7/1958 | Eble | 167—83 |
| 2,897,121 | 7/1959 | Wagner | 167—82 |
| 2,969,331 | 1/1961 | Brynko et al. | 252—316 |

LEON D. ROSDOL, *Primary Examiner.*

JULIUS GREENWALD, *Examiner.*

R. D. LOVERING, *Assistant Examiner.*